(12) United States Patent
Donderici et al.

(10) Patent No.: US 10,502,856 B2
(45) Date of Patent: Dec. 10, 2019

(54) ARRAY LATEROLOG TOOL TECHNIQUES

(71) Applicant: Halliburton Energy Services, Inc., Houston, TX (US)

(72) Inventors: Burkay Donderici, Houston, TX (US); Baris Guner, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 312 days.

(21) Appl. No.: 14/899,948

(22) PCT Filed: Aug. 14, 2013

(86) PCT No.: PCT/US2013/054879
§ 371 (c)(1),
(2) Date: Dec. 18, 2015

(87) PCT Pub. No.: WO2015/023271
PCT Pub. Date: Feb. 19, 2015

(65) Prior Publication Data
US 2016/0139289 A1  May 19, 2016

(51) Int. Cl.
*G01V 3/20* (2006.01)
*E21B 49/00* (2006.01)

(52) U.S. Cl.
CPC ............... *G01V 3/20* (2013.01); *E21B 49/00* (2013.01)

(58) Field of Classification Search
CPC .. G01V 3/20; G01V 3/24; E21B 49/00; E21B 49/087; E21B 49/005
See application file for complete search history.

(56) References Cited

U.S. PATENT DOCUMENTS

| | | | |
|---|---|---|---|
| 4,335,353 A | 6/1982 | Lacour-gayet | |
| 4,882,542 A | 11/1989 | Vail, III | |
| 6,023,168 A | 2/2000 | Minerbo | |
| 7,046,010 B2 | 5/2006 | Hu et al. | |

(Continued)

FOREIGN PATENT DOCUMENTS

| | | | |
|---|---|---|---|
| WO | WO-2005111664 A1 | | 11/2005 |
| WO | WO 2012/067817 A1 | * | 5/2012 |

(Continued)

OTHER PUBLICATIONS

Australian Application Serial No. 2013397964, First Examiners Report dated Mar. 23, 2016, 3 pgs.

(Continued)

*Primary Examiner* — Cuong B Nguyen
(74) *Attorney, Agent, or Firm* — Gilliam IP PLLC

(57) ABSTRACT

Apparatus and techniques are described, such as for obtaining information indicative of a formation resistivity, such as using an array laterolog apparatus. For example, an electrical excitation is coupled from a well tool in a borehole to a geologic formation through which the borehole extends, the excitation coupled through excitation electrodes on the well tool selected according to a specified excitation mode, and induced voltages are received from the geologic formation resulting from the excitation using monitor electrodes selected according to the specified excitation mode. In some examples, a voltage difference between a first pair of monitor electrodes is estimated through use of the induced voltage received through at least one additional monitor electrode.

13 Claims, 8 Drawing Sheets

(56) References Cited

U.S. PATENT DOCUMENTS

| | | |
|---|---|---|
| 2008/0252296 A1 | 10/2008 | Hu et al. |
| 2008/0272789 A1 | 11/2008 | San Martin et al. |
| 2013/0234718 A1* | 9/2013 | Li .......................... G01V 3/24 |
| | | 324/355 |
| 2015/0177406 A1 | 6/2015 | Li et al. |

FOREIGN PATENT DOCUMENTS

| | | |
|---|---|---|
| WO | WO-2012067599 A1 | 5/2012 |
| WO | WO-2012067817 A1 | 5/2012 |
| WO | WO-2015023271 A1 | 2/2015 |

OTHER PUBLICATIONS

"European Application Serial No. 13891468.4, Office Action dated Jan. 29, 2016", 2 pgs.
"European Application Serial No. 13891468.4, Response filed Jul. 28, 2016 to Office Action dated Jan. 29, 2016", 12 pgs.
"Gulf Cooperation Council Application Serial No. 2014-27683, First Examiner Report dated Apr. 20, 2017", 5 pages.
"International Application Serial No. PCT/US2013/054879, International Preliminary Report on Patentability dated Nov. 2, 2015", 6 pgs.
"International Application Serial No. PCT/US2013/054879, International Search Report dated May 14, 2014", 4 pgs.
"International Application Serial No. PCT/US2013/054879, Written Opinion dated May 14, 2014", 8 pgs.
Probst, Hilmar, et al., "Forsmark site investigation—Geophysical borehole logging using the antares dual-laterolog in KFM01A and KFM02A", P-05-110, SKB, (May 2005), 31 pgs.
MX Application Serial No. MX/a/2015/017038, Office Action, dated Jun. 27, 2019, 5 pages.

\* cited by examiner

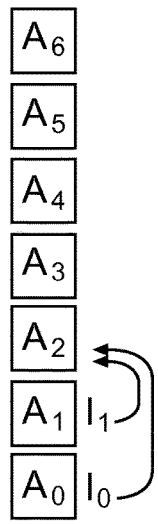
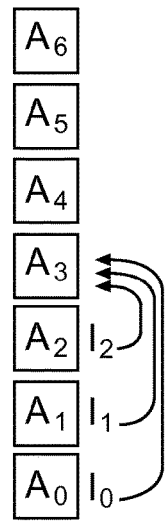
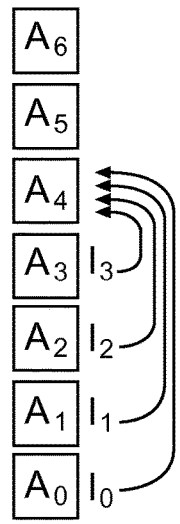
Fig. 4A          Fig. 4B          Fig. 4C
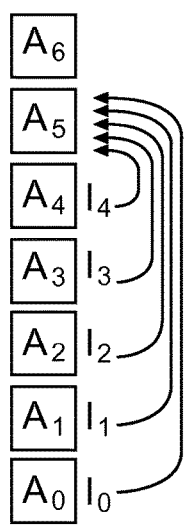
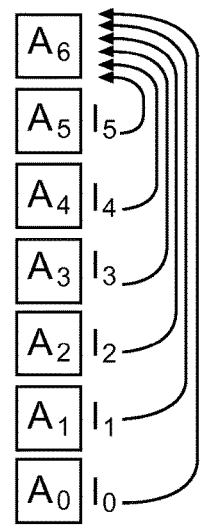
Fig. 4D          Fig. 4E

ARRAY LATEROLOG TOOL TECHNIQUES

PRIORITY APPLICATION

This application is a U.S. National Stage Filing under 35 U.S.C. 371 from International Application No. PCT/US2013/054879, filed Aug. 14, 2013; and published as WO 2015/023271 on Feb. 19, 2015; which application and publication are incorporated herein by reference in their entirety.

BACKGROUND

Various techniques may be used to evaluate geological formations. For example, measurements may be made using tools located within a borehole such as in support of geophysical and petrophysical exploration or resource extraction. In one approach, an apparent resistivity (or conductivity) of a formation may be evaluated such as by injecting a current from a location within the borehole into a portion of the formation, and conductively measuring a resulting voltage induced by the current. Such resistivity information may provide a general indication of formation composition or geometry, including providing indicia of invasion or hydrocarbon presence.

Early examples of this type of borehole resistivity (i.e., "galvanic") measurement tools generally provided virtually no control over a radial depth of resistivity investigation into a formation. Later examples included one or more "guard" electrodes configured to provide an equal potential (or "equipotential") region in a medium nearby an electrode array, thus forcing a larger proportion of the injected current into the formation than earlier tools. Such a configuration is generally referred to as a "laterolog" or "guard log" tool.

Further development of laterolog tools included providing an array of current and monitor electrodes, such as to provide resistivity logging for a variety of relatively shallower or relatively deeper radial depths of investigation. In an array laterolog, focusing of an injected current may be established using hardware or software techniques, or a combination of both hardware and software techniques.

Despite these advances, certain measurement scenarios may still be problematic for array laterolog measurements. For example, when a formation resistivity is much larger than a resistivity of mud located in the borehole, the measured voltage differences between some of the monitor electrodes may be very small, or even below a noise floor of the system. Measurements using such affected monitor electrodes may therefore be impractical because of error induced by noise or interference in the system. Also, an apparent formation resistivity determined using such confounded measurements may be inaccurate, particularly after software-based focusing of information obtained from the affected monitor electrodes.

In one approach, attempts to manage such errors have included mechanical and electrical solutions that attempt to reduce coupling between electrodes or attempt to reduce a system thermal noise. In other approaches, attempts have been made to reduce noise effects by averaging, reduction of tool dimensions, or by increasing the emitted current in order to increase the monitor electrode voltages. An alternative approach is presented below.

BRIEF DESCRIPTION OF THE DRAWINGS

FIGS. 4A through 4E illustrate generally examples of respective focusing modes, such as shown in relation to half of the symmetrical array of the example of FIG. 3.

DETAILED DESCRIPTION

Apparatus and techniques are described, such as for obtaining information indicative of a formation resistivity, such as using an array laterolog apparatus. For example, an electrical excitation is coupled from a well tool in a borehole to a geologic formation through which the borehole extends, the excitation coupled through excitation electrodes on the well tool selected according to a specified excitation mode, and induced voltages are received from the geologic formation resulting from the excitation using monitor electrodes selected according to the specified excitation mode. In some examples, a voltage difference between a first pair of monitor electrodes is estimated through use of the induced voltage received through at least one additional monitor electrode.

The present inventors have recognized, among other things, that a voltage difference received from a first pair of monitor electrodes, or through other measurement, may be estimated. An estimate may be constructed using an algebraic combination of measurements received from other electrodes, and/or or from one or both electrodes in the first pair of monitoring electrodes, such as received in a different excitation mode.

In particular, the present inventors have also recognized that certain deterministic relationships exist between voltages at different monitor electrodes and voltage differences between different monitor electrode pairs, particularly in cases where the formation resistivity is much larger than the mud resistivity. These relationships may be exploited to replace highly error-prone measurements corresponding to certain excitation modes with algebraic combinations of other measurements that are less susceptible to error. For example, when actual monitored voltages are at or near a noise floor of the system, such estimated measurements may instead be used, such as for determination of an apparent formation resistivity.

Thus, accuracy and operational resistivity range of an array laterolog tool is improved, because the tool is capable of obtaining resistivity information over a larger range of formation and borehole parameters as compared to array laterolog techniques lacking such estimation capability.

Figure 1:
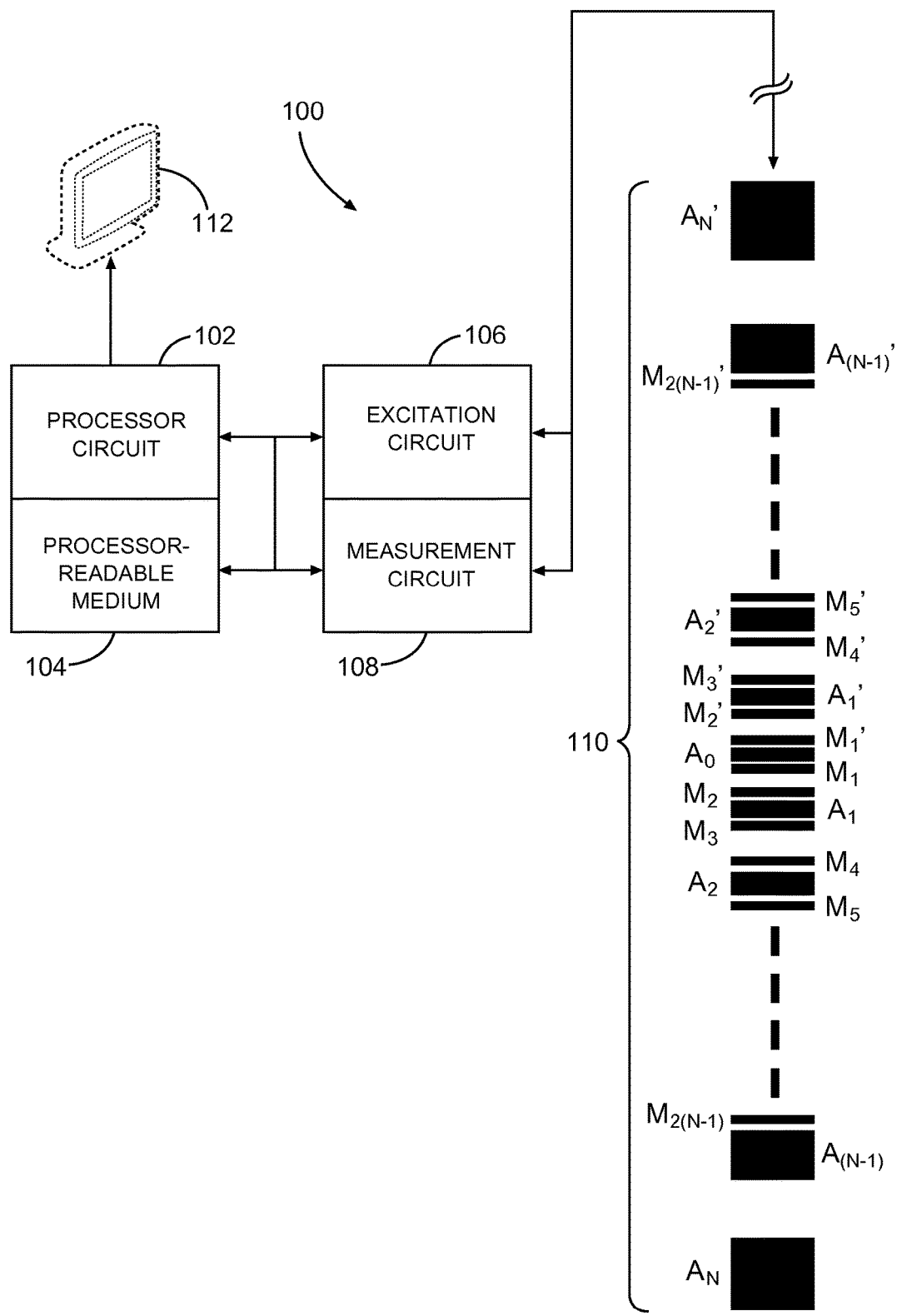
FIG. 1 illustrates generally an example of an apparatus including an array of current and monitor electrodes, such as for obtaining information indicative of a formation resistivity.

FIG. 1 illustrates generally an example of an apparatus 100, including an electrode array 110 of current and monitor electrodes, such as for obtaining information indicative of a formation resistivity.

An array laterolog tool, such as including the electrode array 110, is generally used to obtain information indicative of a resistivity (or conductivity) of portions of a geologic formation at a variety of radial depths extending laterally outward from the array. Such information from multiple depths may be used to correct for effects related to the presence of borehole and invasion layers, such as for determination of an "apparent" or corrected formation resistivity.

In FIG. 1, the electrode array 110 may include ring-shaped electrodes, such as located along a longitudinal axis of a tool body sized and shaped for deployment within a borehole. Other electrode shapes may be used, such as rectangular or button-shaped electrodes. Such electrodes can be arranged or spaced radially around a tool body or otherwise arranged on the tool body.

Figure 9:
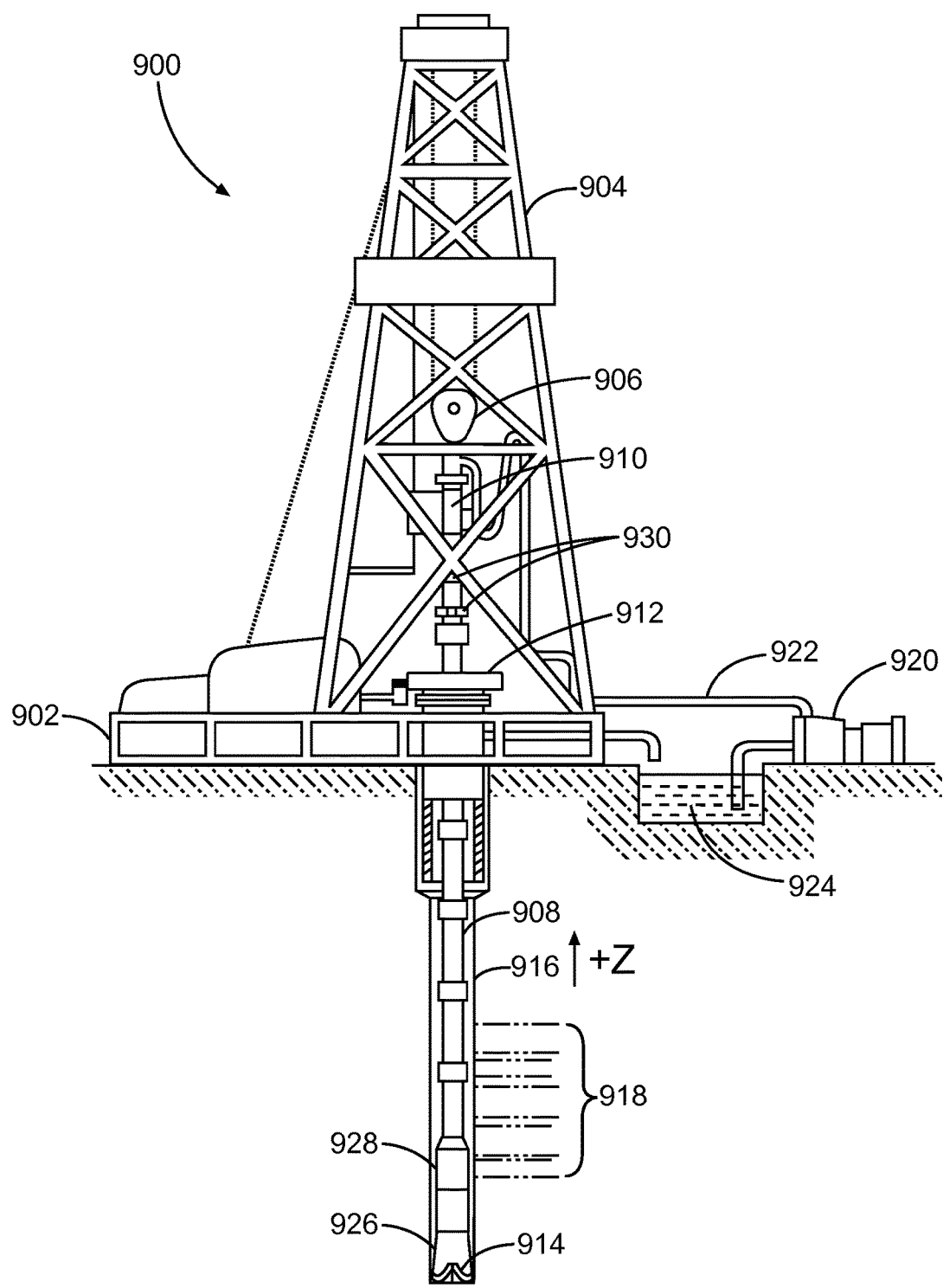
FIG. 9 illustrates generally an example of a drilling apparatus, such as including a measure-while-drilling (MWD) or log-while-drilling (LWD) capability.
Figure 10:
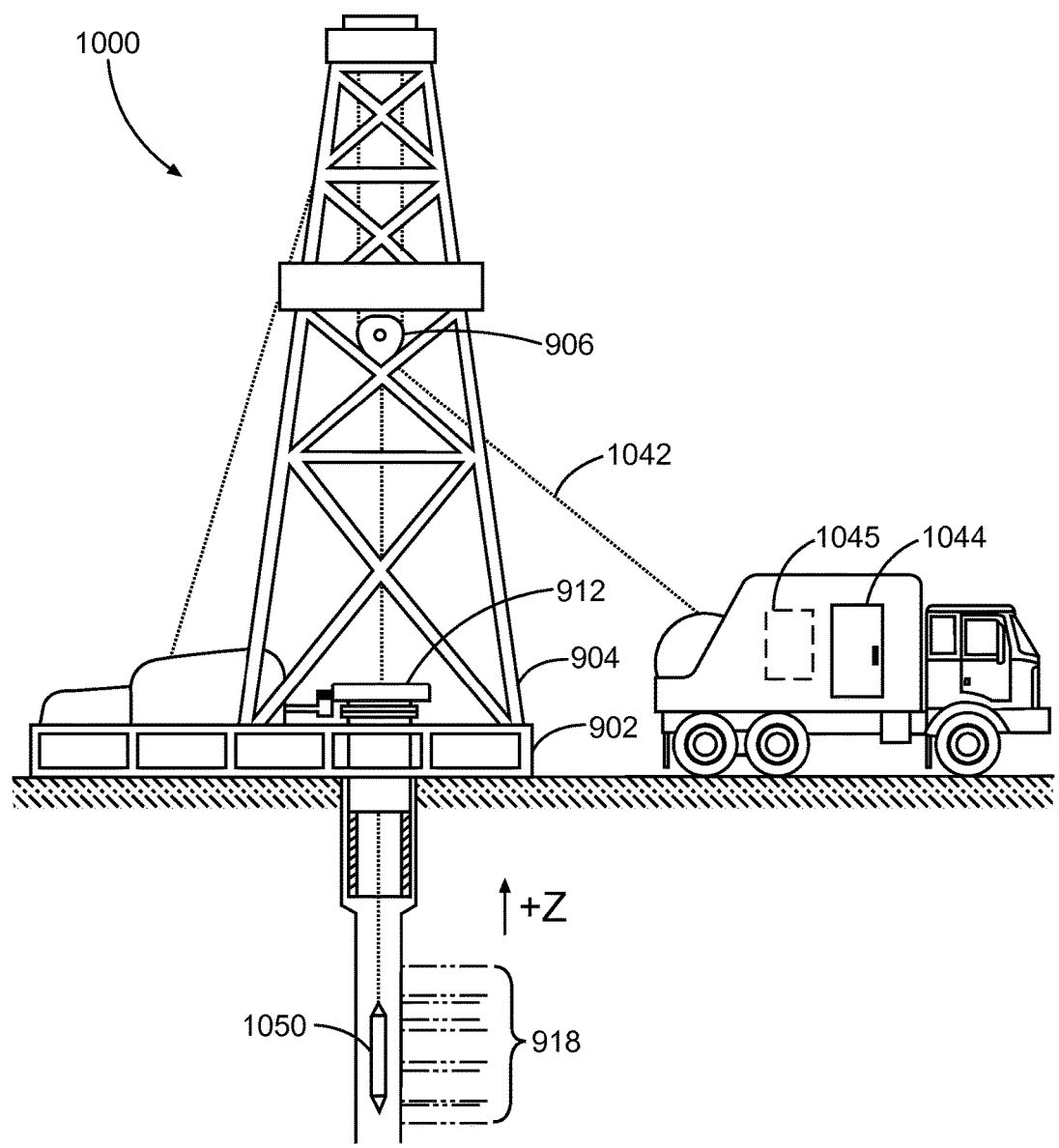
FIG. 10 illustrates generally an example of a wireline logging apparatus.

The electrode array 110 may be included as a portion of a drill string in a log-while-drilling (LWD) application (e.g., as shown in FIG. 9), or the electrode array 110 may be included as a portion of a wireline sonde (e.g., as shown in FIG. 10). Other configurations may be used, such as including a tubing-conveyed downhole logging configuration.

The electrode array 110 is coupled to a excitation circuit 106 and a measurement circuit 108, such as controlled by a processor circuit 102 according to instructions stored in a processor-readable medium 104. The processor circuit 102 and processor-readable medium 104 may be located within a tool body or sonde downhole, or as a portion of a surface processing system. For example, the processor circuit 102 may be coupled to a display 112, such as to present information indicative of a formation resistivity to a user, or to provide other information regarding status or control of various portions of the apparatus 100.

The phrase "processor-readable medium" shall be taken to include any tangible non-transitory device which is capable of storing or encoding a sequence of instructions for execution by the machine and that causes the machine to perform any one of the described and/or claimed methodologies. Such a processor-readable medium 104 includes a machine-readable medium or computer readable medium. The term "non-transitory medium" expressly includes all forms of storage devices, including drives (optical, magnetic, etc.) and all forms of memory devices (e.g., Dynamic Random Access Memory (DRAM), Flash (of all storage designs, including NAND or NOR topologies), Static Random Access Memory (SRAM), Magnetic Random Access Memory (MRAM), phase change memory, etc., as well as all other structures designed to store information of any type for later retrieval. In an example, one or more of the techniques described herein, such as the techniques shown in FIGS. 5 through 8, may be implemented at least in part as instructions stored on the processor-readable medium 104. Such instructions cause the processor circuit 102 or other portions of the apparatus 100 to perform various operations, such as including portions or entireties of one or more techniques described herein.

In an electrical context, use of the phrase "coupled" or "coupling" may refer to either direct coupling, such as conductive electrical coupling (e.g., as in the example of excitation currents conductively coupled into a formation), or indirect coupling (e.g., wireless, reactive, or electromagnetic coupling). In the mechanical context, "coupled" or "coupling" may refer to a direct mechanical connection, or an indirect mechanical connection through one or more other mechanical portions of an example.

In the illustrative and generalized example of the electrode array 110 of FIG. 1, a centrally-located electrode $A_0$ is designated as a "survey electrode," which in this example is coupled to the excitation circuit 106 and other electrodes $(A_1, A_1', \ldots, A_N, A_N')$, be referred to as "guard electrodes" are also coupled to the excitation circuit 106. A respective combination of the 2N guard electrodes and the survey electrode, $A_0$, is used to couple an excitation generated by the excitation circuit 106 (e.g., one or more conductively coupled currents) to a formation from a location within a borehole. The respective combination is established according to a specified excitation mode. Examples of such excitation modes are shown illustratively in FIG. 3, and corresponding focusing modes are generally established using the information obtained from each excitation mode, such as shown FIGS. 4A through 4E.

In many examples, an excitation current injected into the formation using the excitation electrodes $A_0$ and $A_1$, $A_1', \ldots, A_N, A_N'$ will induce respective voltages which are received using one or more monitor electrodes, such as the 4N−4 monitor electrodes $(M_1, M_1', M_2, M_2', \ldots, M_{2(N-1)}, M_{2(N-1)}')$ shown in the illustrative example of the electrode array 110. The monitor electrodes may be coupled to a measurement circuit 108, to receive voltages induced in response to the specified current excitation mode. As discussed further below, a hardware focusing technique, a software focusing technique, or a combination of hardware- and software-based focusing techniques may be used, to obtain information indicative of formation resistivity corresponding to a variety of radial depths within the formation.

An excitation is generally a current injected into the formation by a specified combination of excitation electrodes according to the selected excitation mode. In many examples, an excitation generated according to the selected excitation mode will include a specified alternating current (AC) current waveform at a specified frequency. In this manner, more than one excitation can be provided simultaneously, using different respective excitation frequencies corresponding to respective excitation modes.

Figure 2:
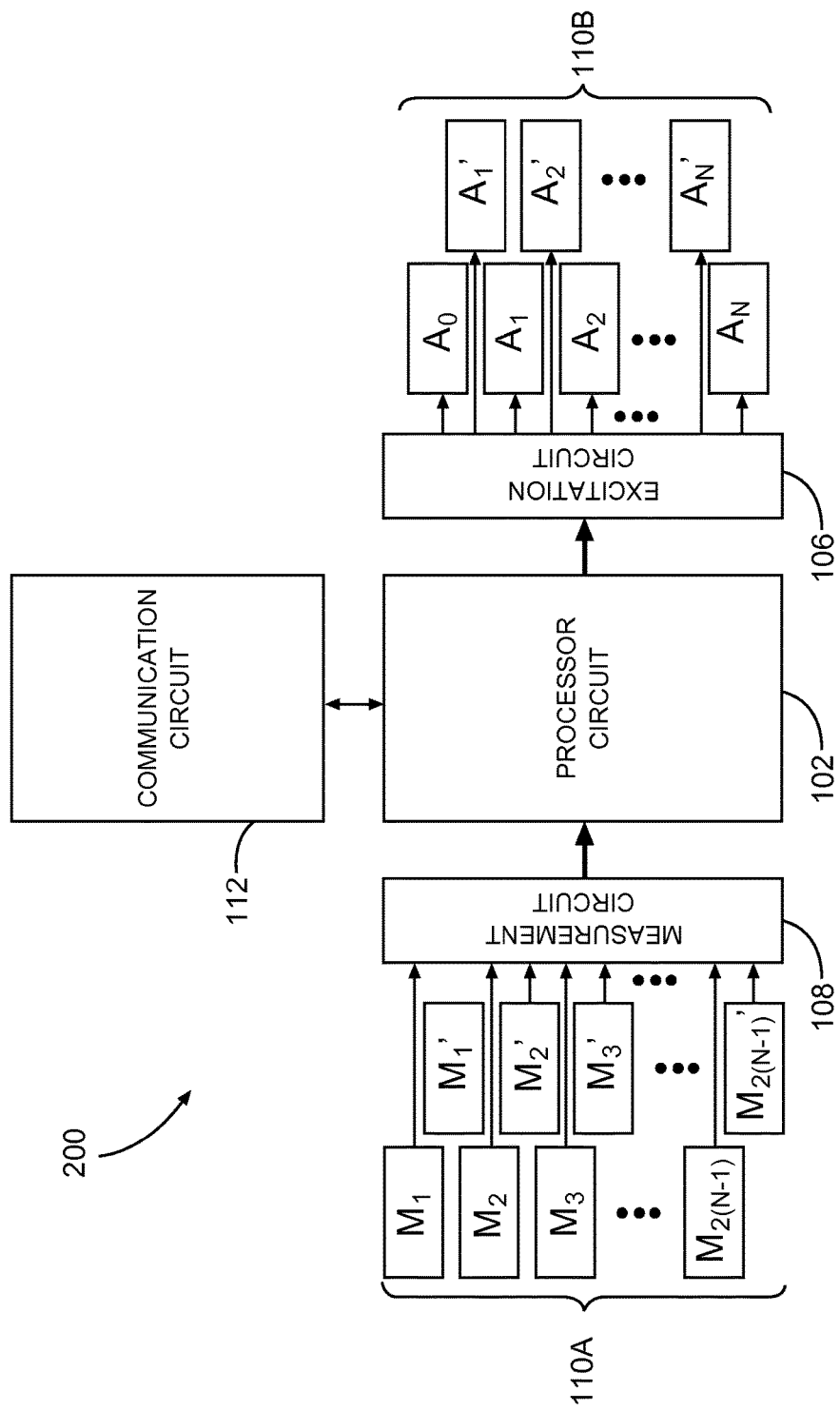
FIG. 2 illustrates generally an example of an apparatus including an array of current and monitor electrodes, such as for obtaining information indicative of a formation resistivity.

FIG. 2 illustrates generally an example of an apparatus 200, including an array of excitation electrodes 110B, $A_0$ and $A_1, A_1', \ldots, A_N, A_N'$, and an array of monitor electrodes 110A, $M_1, M_1', M_2, M_2', \ldots, M_{2(N-1)}, M_{2(N-1)}'$, similar to the example 110 of FIG. 1, such as for obtaining information indicative of a formation resistivity. As discussed in the example of FIG. 1, the excitation electrodes 110B may be coupled to respective channels of an excitation circuit 106, and may be independently controlled by a respective current source included within the excitation circuit 106. As one example of such, respective symmetrically-located current electrodes such as $A_N$ and $A_N'$ may be conductively coupled together to establish a common potential at the respective symmetrically-located electrodes.

In some examples, techniques are used to facilitate hardware or software focusing. For example, respective currents injected between respective pairs of excitation electrodes 110B may be injected at different respective frequencies of excitation. In this manner, a current injected from a particular combination of excitation electrodes 110B may be discerned from other currents. In one approach, the respective frequencies of such excitation currents are staggered in a non-harmonic relationship, but are closely-enough spaced so that a frequency dependence of formation parameters does not significantly impact a resulting resistivity estimate.

Similarly, the monitor electrodes 110A may be coupled to a measurement circuit 108. For example, the measurement circuit 108 may include respective digital-to-analog converters, filters, or other signal conditioning circuitry, such as to conductively obtain signals independently from each of the monitor electrodes 110A, $M_1$, $M_1'$, $M_2$, $M_2'$, $M_{2(N-1)}$, $M_{2(N-1)}'$. Similar to an example above related to the excitation electrodes 110B, respective symmetrically-located monitor electrodes such as $M_{2(N-1)}$ and $M_{2(N-1)}'$ may be conductively coupled together. In an example, adjacent monitor electrodes, such as M1 and M2, may be coupled to a differential voltage amplifier or detector, such as configured to provide information indicative of a voltage difference between the adjacent monitor electrodes.

The measurement circuit 108 may include or may be coupled to one or more comparator circuits, such as for use in determining whether to use actual conductively-received measurements for a particular electrode combination in a particular excitation mode, or to trigger use of an estimation or approximation technique when an electrode combination measurement may be unreliable, such as discussed further below.

The excitation circuit 106 and measurement circuit 108 may be operated under the control of a processor circuit 102, such as including or coupled to a processor-readable medium storing instructions executable by the processor circuit 102, or for storing information related to a current, measurement, or estimation technique as discussed elsewhere herein. The processor circuit 102 may be coupled to a communication circuit 112. For example, the communication circuit may include one or more of a wireless transmitter, receiver or transceiver, such as using an inductive, radiative (e.g., electromagnetic), or acoustic (e.g., mud pulsing) communication scheme. The communication circuit 112 may use other techniques to transmit or receive information, such as a fiber-optic or other optical communication scheme.

In an illustrative example, the apparatus 200 may be located downhole, such as included as a portion of an MWD/LWD logging system or as a portion of a wireline sonde. Alternatively, or in addition, a processor circuit 102 may be located on the surface, such as communicatively coupled to one or more of the excitation circuit 106 or measurement circuit 108 to obtain information indicative of formation resistivity, or to provide processing capability such as to determine one or more measurement estimates related to or in support of an apparent formation resistivity determination.

Figure 3:
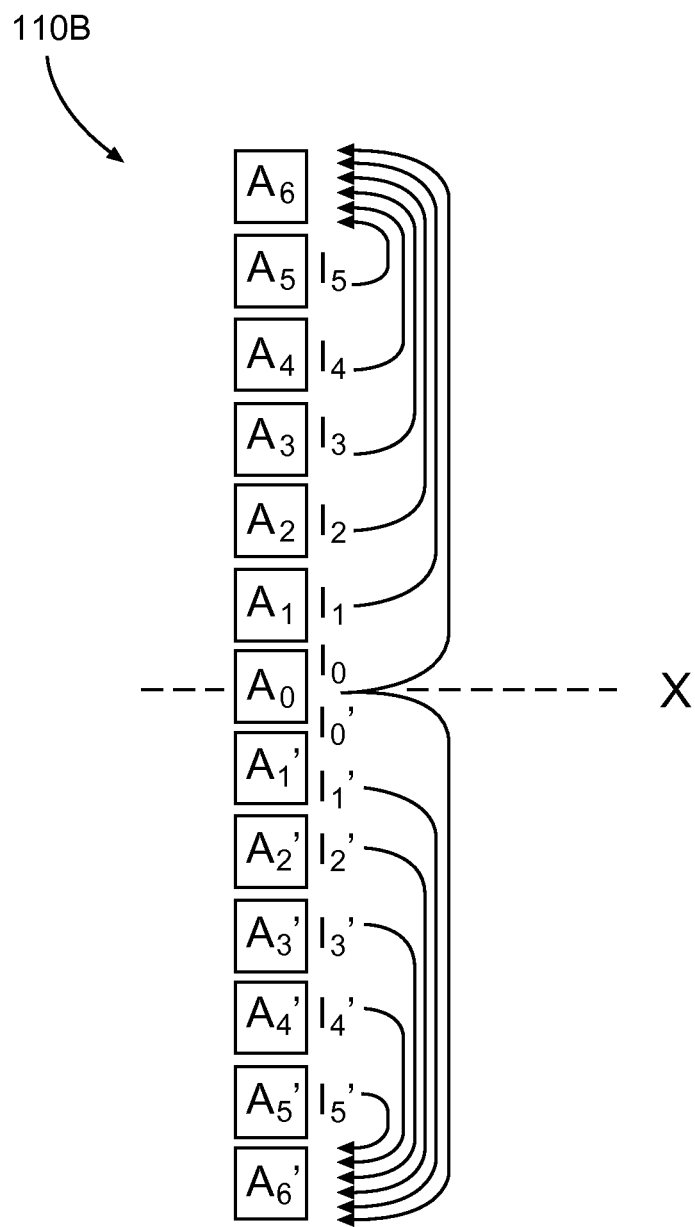
FIG. 3 illustrates generally an example of a current excitation mode provided by an array of current electrodes, arranged symmetrically about a central axis.

FIG. 3 illustrates generally an example of a current excitation mode provided by an array of current electrodes 110B, arranged symmetrically about a central axis, "x." Generally, "N" different excitation modes are defined, and in the illustrative example of FIG. 3, N equals 6. The array of current electrodes 110B may include ring-shaped electrodes arranged along a longitudinal axis of a tool body, such as discussed in examples elsewhere herein. The spacing and shape of respective current electrodes need not be uniform, and are merely shown as uniform in FIG. 3 and FIGS. 4A through 4E for purposes of illustrating examples of the current excitation configurations and various focusing modes.

FIG. 3 shows respective excitation currents $I_0$ through $I_5$ circulating between respective current electrodes $A_0$ through $A_5$ and a commonly-shared return electrode, $A_6$ and symmetrically located electrodes $A_0'$ through $A_5'$ circulating respective excitation currents $I_0'$ through $I_5'$ to a commonly-shared return electrode, $A_6'$. In examples where $A_6$ and $A_6'$ are conductively coupled together or where the excitation currents are otherwise adjusted to provide an equipotential condition between $A_6$ and $A_6'$, a current coupled from a particular electrode, such as $A_5$, will return using both electrode $A_6$ and electrode $A_6'$. For example, currents from non-"primed" electrodes may return using $A_6'$, and vice versa. In some examples, for simplicity, only half of the symmetrically-located electrodes may be shown or discussed, but such discussion may generally be applicable to the full array as shown and discussed in FIGS. 1 through 3.

In an example, the electrode array 110 shown in FIG. 1 may be operable using a variety of different excitation schemes. Measurements received from respective monitor electrodes in the various excitation modes may be combined or otherwise processed to provide focusing modes established to investigate respective radial depths in a formation.

For example, using the notation shown in FIG. 1, "N" different excitation modes may be used, such as including modes that may be represented by the following excitation relationships for each current electrode:

Excitation Mode 1: $I_{A_0} = 1$ Amperes;

$I_{Ai} + I_{Ai}' = 0, i = 1, \ldots, N-1$

Excitation Mode 2: $I_{A_1} + I_{A_1}' = 1$ Amperes;

$I_{A_0} = 0; I_{Ai} + I_{Ai}' = 0, i = 2, \ldots, N-1$ $\vdots$

Excitation Mode N: $I_{A_{N-1}} + I_{A_{N-1}}' = 1$ Amperes;

$I_{A_0} = 0; I_{Ai} + I_{Ai}' = 0, i = 1, \ldots, N-2$

In the examples of excitation modes shown above, $I_{Ai}$ represents the current emitted from a respective electrode, $A_i$. In these excitation mode examples, currents are returned respectively to excitation electrodes $A_N$ and $A_N'$.

In the illustrative example of FIG. 3, N equals 6, and the excitation modes may be defined as follows:

Excitation Mode E1: $I_{A_0} = 1$ Ampere; Returning on $I_{A_6} + I_{A_6'}$,

Excitation Mode E2: $I_{A_1} + I_{A_1}' = 1$ Ampere;

Returning on $I_{A_6} + I_{A_6'}$, $\vdots$

Excitation Mode E6: $I_{A_5} + I_{A_5}' = 1$ Ampere;

Returning on $I_{A_6} + I_{A_6'}$,

As discussed below in the accompanying examples of FIGS. 5 through 7, absolute or differential voltages may be measured using respective monitor electrodes, in each of the excitation modes. In some systems, a voltage-controlled scheme can be used as an alternative to the current-controlled scheme described generally above. In such examples, voltages of respective current electrodes are adjusted to provide the excitation. A hardware or software focusing technique may be used to provide respective focusing modes corresponding to different radial depths of investigation.

FIGS. 4A through 4E illustrate generally examples of focusing modes, shown in relation to half of the symmetrical array of the example of FIG. 3, such as may be obtained using combinations of respective excitation configurations as discussed in relation to FIG. 3. The electrode array 110B shown in FIG. 3, and the half-array examples shown in FIGS. 4A through 4E are merely illustrative of the general example of FIG. 1. As in the illustrative example of FIG. 3, in FIGS. 4A through 4E, N is equal to 6.

As discussed elsewhere herein, focusing techniques may be used, such as taking advantage of the principle of superposition in order to combine measurements from excitation modes such that the current emitted from a survey electrode travels in a path radially outward from the survey electrode, rather than "short circuiting" through the mud or other borehole medium without penetrating into the formation.

For example, a potential difference between specified combinations of monitor electrodes may be set to zero, thus suppressing or inhibiting a flow of excitation current locally in the direction of equipotentially-driven monitor electrodes. Such an equipotential condition may be established such as by varying respective excitation current magnitudes so that the equipotential criterion is met (e.g., a "hardware focusing" approach), or by appropriately weighting contributions from each excitation current by processing signals received using the monitor electrodes (e.g., a "software focusing" approach). For example, such currents may be distinguished such as by using a unique excitation frequency for each excitation current, allowing measurements for multiple modes to be made simultaneously or contemporaneously.

As shown in the examples of FIGS. 4A through 4E, in respective focusing modes, excitation current may be controlled or measurements may be processed to provide a return path for the survey current using different guard electrodes in each mode. A depth of a formation probed by such excitation current is generally proportional to the separation between the current emitting electrode and the return electrode, so different weighted combinations of excitation modes may be employed to make measurements at different depths of investigation as a result. Generally, successively higher modes correspond to deeper radial distances of penetration into the formation with respect to the survey electrode.

A variety of techniques may be used to establish the excitation modes of FIG. 3, or the focusing modes of FIGS. 4A through 4E, such as including one or more of software- or hardware-based focusing techniques.

The various examples discussed below concerning estimation of voltage differences from a monitor electrode may be discussed with respect to the N=6 example of FIGS. 4A through 4E, but are not restricted to this exact configuration. Other numbers and configurations of excitation and monitor electrodes may be used in conjunction with such estimation techniques, for example. Generally, as the excitation mode number increases, emitted currents return to an electrode further away from the centrally-located electrode, $A_0$, such as providing a deeper investigation radially into the formation from the borehole.

FIG. 4A illustrates generally a first focusing mode, referred to herein as "Mode 1," or Resistivity Laterolog Array-1 (RLA1). In Mode 1, currents from $A_0$, $A_1$ and $A_1'$ return respectively to $A_2$ and $A_2'$. A voltage developed a respective monitor electrode is denoted herein as $VM_N$, where "N" represents the electrode position, as shown in FIG. 1, for example, and where $VM_N'$ refers to a monitor electrode in a symmetrically located position from $VM_N$ along the array. In many examples, to accomplish focusing, a voltage difference of $(VM_1+VM_1')-(VM_2+VM_2')$ are set to zero.

FIG. 4B illustrates generally a second focusing mode, referred to herein as "Mode 2," or Resistivity Laterolog Array-2 (RLA2). In Mode 2, currents from $A_0$, $A_1$, $A_1'$, $A_2$ and $A_2'$ return respectively to $A_3$ and $A_3'$ while voltage differences of $(VM_1+VM_1')-(VM_2+VM_2')$ and $(VM_3+VM_3')-(VM_4+VM_4')$ are respectively set at zero for focusing.

FIG. 4C illustrates generally a third focusing mode, referred to herein as "Mode 3," or Resistivity Laterolog Array-3 (RLA3). In Mode 3, currents from $A_0$, $A_1$, $A_1'$, $A_2$, $A_2'$, $A_3$ and $A_3'$ return respectively to $A_4$ and $A_4'$ while voltage differences of $(VM_1+VM_1')-(VM_2+VM_2')$, $(VM_3+VM_3')-(VM_4+VM_4')$ and $(VM_5+VM_5')-(VM_6+VM_6')$ are respectively set at zero for focusing.

FIG. 4D illustrates generally a fourth focusing mode, referred to herein as "Mode 4," or Resistivity Laterolog Array-4 (RLA4). In Mode 4, currents from $A_0$, $A_1$, $A_1'$, $A_2$, $A_2'$, $A_3$, $A_3'$, $A_4$ and $A_4'$ return respectively to $A_5$ and $A_5'$ while voltage differences of $(VM_1+VM_1')-(VM_2+VM_2')$, $(VM_3+VM_3')-(VM_4+VM_4')$, $(VM_5+VM_5')-(VM_6+VM_6')$ and $(VM_7+VM_7')-(VM_8+VM_8')$ are respectively set at zero.

FIG. 4E illustrates generally a fifth focusing mode, referred to herein as "Mode 5," or Resistivity Laterolog Array-5 (RLA5). In Mode 5, currents from $A_0$, $A_1$, $A_1'$, $A_2$, $A_2'$, $A_3$, $A_3'$, $A_4$, $A_4'$, $A_5$ and $A_5'$ respectively return to $A_6$ and $A_6'$ while voltage differences of $(VM_1+VM_1')-(VM_2+VM_2')$, $(VM_3+VM_3')-(VM_4+VM_4')$, $(VM_5+VM_5')-(VM_6+VM_6')$, $(VM_7+VM_7')-(VM_8+VM_8')$ and $(VM_9+VM_9')-(VM_{10}+VM_{10}')$ are respectively set at zero.

A finite element or impedance network modeling code may be used to model the respective voltages induced at the monitor electrodes in response to a modeled excitation mode, such as one of the 6 excitation modes shown and discussed in relation to the example of FIG. 3. A focusing technique may be applied to resulting modeled or measured values, such as according to one of the focusing modes shown in FIGS. 4A through 4E.

As an illustration, in a borehole having a 4 inch radius, a mud resistivity of 0.02 Ohm-meters (Ω-m), and a formation resistivity of 100,000 Ω-m (100 KΩ-m), respective modeled voltage differences from respective pairs of monitor electrodes were simulated for respective excitation modes, as shown below in Table 1, corresponding to the excitation modes E1 through E6 discussed in relation to FIG. 3.

TABLE 1

|       | $VM_1, M_2$ | $VM_3, M_4$ | $VM_5, M_6$ | $VM_7, M_8$ | $VM_9, VM_{10}$ |
|-------|-------------|-------------|-------------|-------------|-----------------|
| $E_1$ | 0.022194    | 0.034607129 | 0.082233    | 0.129638092 | 0.189144857     |
| $E_2$ | −1E−06      | 0.034613036 | 0.082233    | 0.129638179 | 0.189144968     |
| $E_3$ | −1.3E−07    | −9.45558E−07| 0.082234    | 0.129638435 | 0.189145298     |
| $E_4$ | −1.1E−07    | −5.52499E−07| −5.6E−06    | 0.129638504 | 0.189146226     |
| $E_5$ | −8.1E−08    | −4.14807E−07| −4.7E−06    | −3.26657E−06| 0.189146645     |
| $E_6$ | −5E−08      | −2.5765E−07 | −1.15963E−06| −3.03412E−06| −6.86697E−06    |

Some of the modeled voltage differences are extremely small in magnitude, particularly for monitor electrode pairs not aligned with a dominant current return path. Generally, in the relationships shown above, $VM_i, M_j$ represent a voltage difference between monitor electrodes, i, and j, in an excitation mode shown in the corresponding row, $E_k$, where k is the excitation mode.

For example, in Table 1, a voltage difference $VM_1, M_2$ for mode ($E_6$) is in the range of 100's of nanovolts (nV), and therefore any error or noise signal on this order may cause a significant percentage error where a voltage measurement is made using $VM_1, M_2$ in mode ($E_6$). Such error may confound determination of an apparent resistivity because such error may be magnified when the conductively obtained measurements are subjected to hardware or software focusing techniques such as shown in FIGS. 4A through 4E. In some cases, sources of interference or noise in the field may entirely preclude obtaining reliable measurements.

Figure 5:
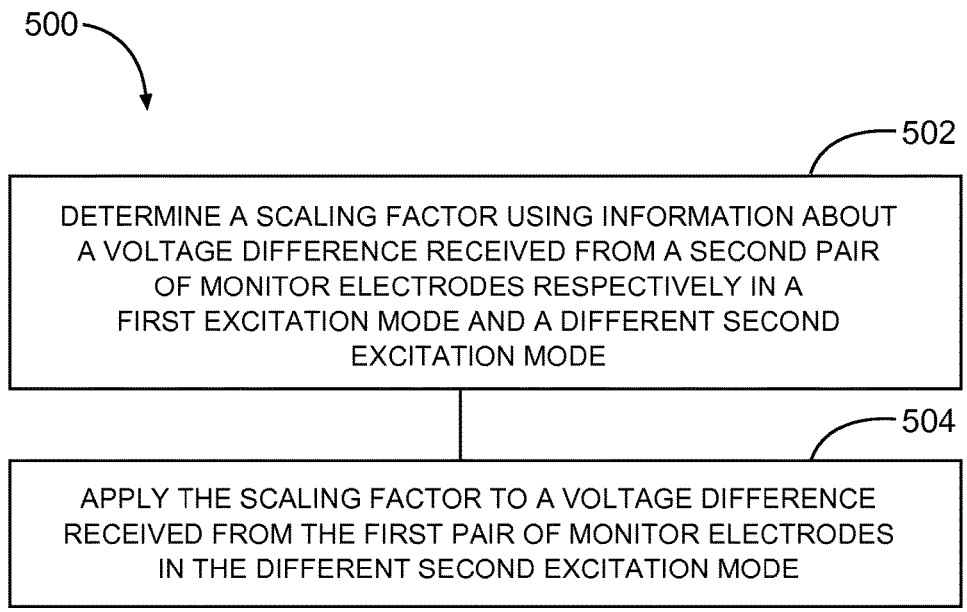
FIG. 5 illustrates generally an example of a technique, such as a method, including estimating a voltage difference corresponding to a first pair of monitor electrodes in a first excitation mode using information about a voltage difference received from a second pair of monitor electrodes.
Figure 6:
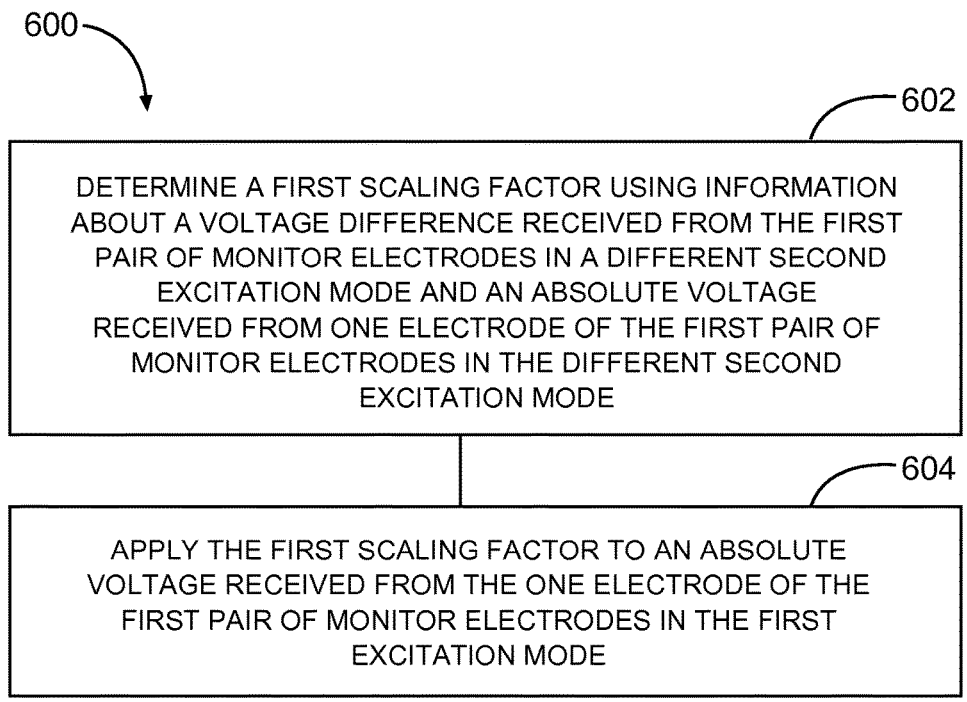
FIG. 6 illustrates generally an example of a technique, such as a method, including estimating a voltage difference corresponding to a first pair of monitor electrodes in a first excitation mode using information about an absolute voltage received from one electrode of the first pair of monitor electrodes in a different second excitation mode.
Figure 7:
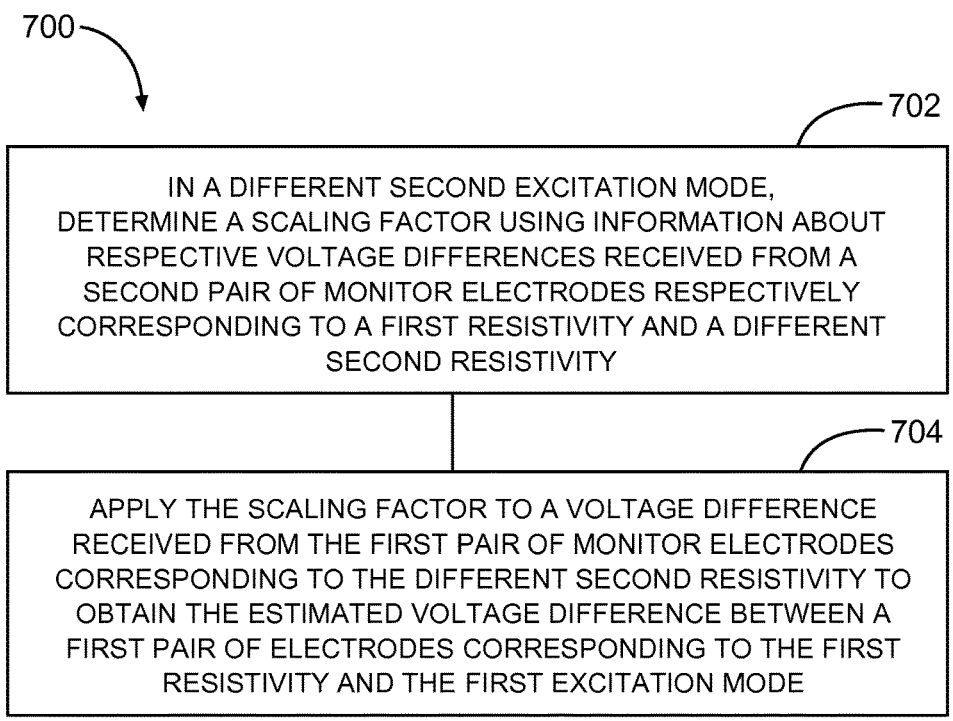
FIG. 7 illustrates generally an example of a technique, such as a method, including estimating a voltage difference corresponding to a first pair of monitor electrodes in a first excitation mode using information about respective voltage differences received from a second pair of monitor electrodes respectively corresponding to a first resistivity and a different second resistivity.

Accordingly, the present inventors have, among other things, developed various techniques to estimate a voltage difference for a first pair of monitor electrodes, such as using information obtained from other monitor electrodes, such as shown in the examples of FIGS. 5-7, or in other examples. Such an estimated or approximated voltage difference may be substituted for an actual measured differential voltage, to permit apparent resistivity determination.

An Estimation Technique Using Voltage Differences

FIG. 5 illustrates generally an example of a technique 500, such as a method, including estimating a voltage difference corresponding to a first pair of monitor electrodes in a first excitation mode using information about a voltage difference received from a second pair of monitor electrodes. Use of the phrase "first" or "second" in FIG. 5, FIGS. 6-7, or the claims does not refer literally to focusing modes such as "Mode 1" or "Mode 2," but merely serves to distinguish between respective excitation modes such as discussed in relation to the example of FIG. 3.

For example, at 502, a first scaling factor may be determined using information about a voltage difference received from a different second pair of monitor electrodes respectively in a first excitation mode, and a different second excitation mode. At 504, the scaling factor may be applied to the voltage difference received from the first pair of monitor electrodes in the different second excitation mode, such as to provide an estimate of the voltage difference that would be obtained in the first mode. Such an estimated voltage difference may be used for a subsequent apparent resistivity determination, rather than an actual voltage difference received from the first pair of monitor electrodes in the first mode, such as when such measurement is not practical due to the limits of reliable detection of the voltage difference of the first pair of monitor electrodes in the first mode.

The technique shown in FIG. 5 may be illustrated by several examples. For example, the following table, Table 2, shows respective ratios of voltage differences corresponding to different excitation modes.

TABLE 2

|              | $VM_1, M_2$ | $VM_3, M_4$ | $VM_5, M_6$ | $VM_7, M_8$ | $VM_9, VM_{10}$ |
|--------------|-------------|-------------|-------------|-------------|-----------------|
| $VE_1/VE_2$  | −2.20E+04   | 1.00E+00    | 1.00E+00    | 1.00E+00    | 1.00E+00        |
| $VE_2/VE_3$  | 7.71E+00    | −3.66E+04   | 1.00E+00    | 1.00E+00    | 1.00E+00        |
| $VE_3/VE_4$  | 1.21E+00    | 1.71E+00    | −4.53E+04   | 1.00E+00    | 1.00E+00        |
| $VE_4/VE_5$  | <u>1.33E+00</u> | <u>1.33E+00</u> | 9.70E−01    | −3.97E+04   | 1.00E+00        |
| $VE_5/VE_6$  | <u>1.61E+00</u> | <u>1.61E+00</u> | <u>1.61E+00</u> | 1.08E+00    | −2.75E+04       |

Table 2 was obtained using the finite element modeling of Table 1 by dividing a voltage difference value in one row by the voltage difference value directly below it. For example, the value $VE_1/E_2$ may be obtained by dividing the modeled voltage difference $VM_1, M_2$ received in excitation mode $E_1$ by the voltage difference $VM_1, M_2$ received in excitation mode $E_2$.

The underlined values show that for certain tool and borehole geometries, and for certain ranges of resistivity, such as the mud resistivity of 0.02 Ω-m and the formation resistivity of 100,000 Ω-m, certain values in Table 2 are similar. For example, the ratios between the $E_4$ and $E_5$ excitation modes are very similar for monitor electrode pairs $M_1, M_2$ and $M_3, M_4$. Similarly, ratios between the $E_5$ and $E_6$ excitation modes are very similar for monitor electrode pairs $M_1, M_2$; $M_3, M_4$; and $M_5, M_6$.

The following table, Table 3, shows respective ratios of voltage differences corresponding to different excitation modes. In contrast to Table 2, the values in Table 3 were obtained using the finite element modeling of Table 1 by dividing a voltage difference value in one column by the voltage difference value in the column to the right. For example, the value $VM_1, M_2/VM_3, M_4$ is the ratio of $VM_1, M_2$ to $VM_3, M_4$ for the excitation mode corresponding to the row containing the value.

TABLE 3

| | $VM_1, M_2/VM_3, M_4$ | $VM_3, M_4/VM_5, M_6$ | $VM_5, M_6/VM_7, M_8$ | $VM_7, M_8/VM_9, M_{10}$ |
|---|---|---|---|---|
| $E_1$ | 0.641321254 | 0.42081913 | 0.634362448 | 0.685390525 |
| $E_2$ | −2.91488E−05 | 0.420890625 | 0.634362521 | 0.685390577 |
| $E_3$ | 0.138396587 | −1.1498E−05 | 0.634366014 | 0.685390738 |
| $E_4$ | <u>0.195247412</u> | 0.304401963 | −1.4001E−05 | 0.685387736 |
| $E_5$ | <u>0.195546363</u> | <u>0.221725172</u> | 0.572715899 | −1.727E−05 |
| $E_6$ | <u>0.195672424</u> | <u>0.222182746</u> | 0.382197445 | 0.441842147 |

In Table 3, it may be observed that $VM_1,M_2/VM_3,M_4$ is very similar for $E_4$, $E_5$, and $E_6$ excitation modes. Similarly, $VM_3,M_4/VM_5,M_6$ is very similar for $E_5$ and $E_6$ excitation modes. Using the observations that certain elements in Tables 2 and 3 are similar, as noted above, various relationships may be developed, such as using the ratios as scaling factors to adjust measurements received from one monitor electrode combination in order to estimate a measurement that would be received from another monitor electrode combination.

For example, the following relationships illustrate generally how various voltage differences may be estimated:

$$VM_1, M_2(E_5) \approx \frac{VM_1, M_2(E_4) \times VM_3, M_4(E_5)}{VM_3, M_4(E_4)}$$

$$VM_3, M_4(E6) \approx \frac{VM_3, M_4(E_5) \times VM_5, M_6(E_6)}{VM_5, M_6(E_5)}$$

$$VM_1, M_2(E_6) \approx \frac{VM_1, M_2(E_4) \times VM_3, M_4(E_5) \times VM_5, M_6(E_6)}{VM_3, M_4(E_4) \times VM_5, M_6(E_5)}$$

Generally, in the relationships shown above, VMi,Mj(Ek) represents a voltage difference between monitor electrodes, i, and j, in an excitation mode, Ek. As an illustration, in the first relation shown above, $VM_1,M_2(E_4)$ refers to a voltage difference received from a first pair of monitor electrodes in a first excitation mode (e.g., an actual voltage difference received from the electrode array). A voltage difference received from a second pair of monitor electrodes in different second excitation mode is represented by $VM_3,M_4(E_5)$, and a voltage difference received from the second pair of electrodes in the first excitation mode is represented by $VM_3,M_4(E_4)$. The ratio of $VM_3,M_4(E_5)$ to $VM_3,M_4(E_4)$ may be treated as a scaling factor.

In this manner, an actual measurement from the first pair of monitor electrodes in the first mode, $VM_1,M_2(E_4)$ may be multiplied by the scaling factor (e.g., $VM_3,VM_4(E_5)/VM_3, M_4(E_4)$) to provide an approximated value (e.g., an estimate) of the measurement that would be received from $VM_1,M_2$ ($E_5$), rather than requiring an actual measurement of $VM_1$, $M_2(E_5)$. Other estimates may be obtained similarly, such as shown above, and such estimates may be "stacked." For example, the estimate of $VM_1,M_2(E_6)$ may include using the estimate of $VM_1,M_2(E_5)$ multiplied by a second scaling factor (e.g., a ratio of $VM_5,M_6(E_6)/VM_5,M_6(E_5)$, for example).

An illustrative example of results obtained from a finite element model in combination with the techniques discussed above is shown in Table 4, below.

TABLE 4

| | $VM_1, M_2$ | $VM_3, M_4$ | $VM_5, M_6$ | $VM_7, M_8$ | $VM_9, M_{10}$ |
|---|---|---|---|---|---|
| $E_1$ | 0.02219429 | 0.03460713 | 0.082237538 | 0.129638092 | 0.189144857 |
| $E_2$ | −1.009E−06 | 0.03461304 | 0.082237602 | 0.129638179 | 0.189144968 |
| $E_3$ | −1.31E−07 | −9.46E−07 | 0.082238217 | 0.129638435 | 0.189145298 |
| $E_4$ | −1.08E−07 | −5.52E−07 | −1.81503E−06 | 0.129638504 | 0.189146226 |
| $E_5$ | <u>−8.10E−08</u> | −4.15E−07 | −1.87082E−06 | −3.26657E−06 | 0.189146645 |
| $E_6$ | <u>−5.02E−08</u> | <u>−2.57E−07</u> | −1.15963E−06 | −3.03412E−06 | −6.86697E−06 |

The underlined elements in Table 4 were generated using the technique and relationships discussed above in relation to Tables 2 and 3, and generally show good agreement with the modeled values in Table 1. The underlined portions represent the values modeled using the estimation technique. The error induced by such approximations was simulated and found to be less than 1% of non-approximated model values, which is negligible compared to other errors that would occur using actual measurements, such as errors attributable to system or environmental factors.

Figure 8:
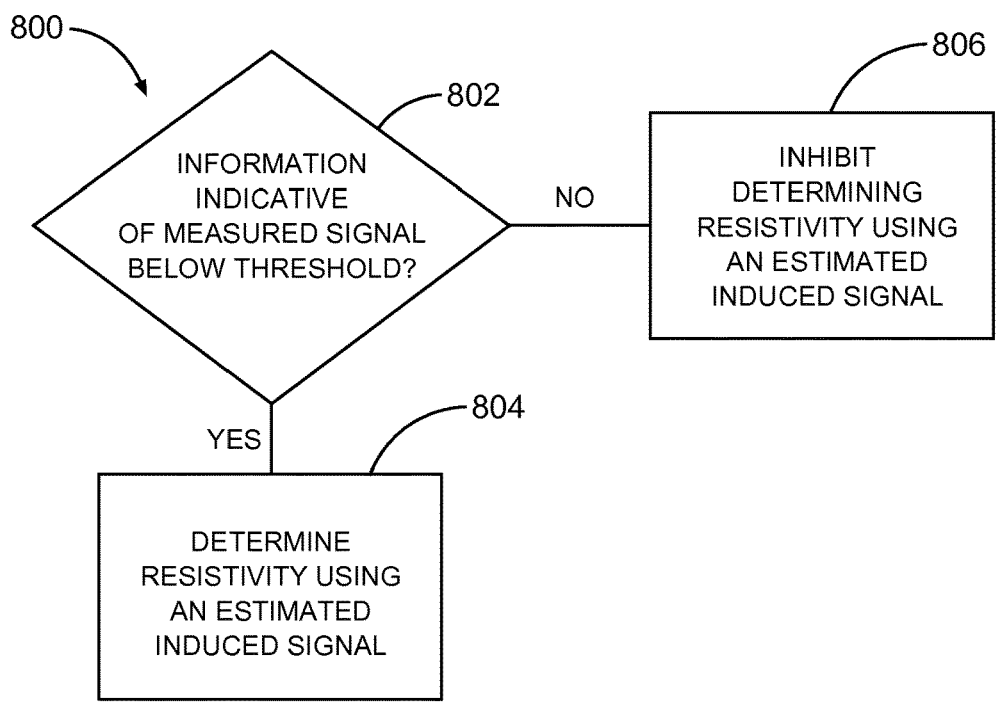
FIG. 8 illustrates generally an example of a technique, such as a method, including comparing information indicative of a measured signal (e.g., a conductively received signal from a monitor electrode) to a specified threshold, and in response, determining a resistivity using an estimated induced signal or inhibiting determining the resistivity using the estimated induced signal.

As discussed in the example of FIG. 8 and elsewhere, such approximation may be inhibited or suppressed, such as when low-mud-resistance/high-formation-resistance criteria are not satisfied. In such scenarios where the formation resistance is lower, actual conductively-received measurement may be made using the monitor electrodes, rather than relying on an estimated or approximate measurement value derived from other measurements.

An Estimation Technique Using Voltage Differences and Absolute Voltages

The techniques discussed in relation to FIG. 5 use voltage differences that may be received from, or estimated for, respective pairs of monitor electrodes. Absolute voltages, such as conductively received with reference to a distantly-located reference conductor, also provide useful information for use in estimating a voltage difference corresponding to a selected monitor electrode pair.

FIG. 6 illustrates generally an example of a technique 600, such as a method, including estimating a voltage difference corresponding to a first pair of monitor electrodes in a first excitation mode using information about an absolute voltage received from one electrode of the first pair of monitor electrodes in a different second excitation mode.

For example, at 602, a first scaling factor may be determined using information about a voltage difference received from the first pair of monitor electrodes in a different second excitation mode, and from an absolute voltage received from one electrode of the first pair of monitor electrodes in the different second excitation mode. At 604, the first scaling factor may be applied to an absolute voltage received from the one electrode of the first pair of monitor electrodes in the first excitation mode.

As in the example of FIG. 5, the technique 600 of FIG. 6 may be illustrated by several examples. For example, the following table, Table 5, shows respective absolute voltages simulated for one electrode of each respective monitor electrode pair using finite element modeling using a problem geometry (e.g., wellbore and array configuration, and material parameters) similar to the example of FIG. 5.

TABLE 5

|  | $VM_1$ | $VM_3$ | $VM_5$ | $VM_7$ | $VM_9$ |
|---|---|---|---|---|---|
| $E_1$ | 1.212775 | 1.116893 | 1.02E+00 | 0.874495 | 0.67685 |
| $E_2$ | 1.147624 | 1.116945 | 1.020846 | 0.874541 | 0.676896 |
| $E_3$ | 1.050638 | 1.050639 | 1.020983 | 0.874678 | 0.677032 |
| $E_4$ | 0.907346 | 0.907347 | 0.907349 | 0.875059 | 0.677412 |
| $E_5$ | 0.712212 | 0.712212 | 0.712214 | 0.712218 | 0.678264 |
| $E_6$ | 0.460221 | 0.460222 | 0.460223 | 0.460225 | 0.46023 |

The values modeled in Table 5, above, may be divided with the modeled voltage difference measurements shown in the example of Table 1, such as to obtain a table of ratios of absolute-to-differential voltages as shown in Table 6, below.

by an overbar notation. Simulated results using the technique shown in the illustrative example above are included below in Table 7, and again, show agreement with the results of Table 1.

TABLE 7

|  | $VM_1, M_2$ | $VM_3, M_4$ | $VM_5, M_6$ | $VM_7, M_8$ | $VM_9, M_{10}$ |
|---|---|---|---|---|---|
| $E_1$ | 0.022194287 | 0.034607 | 0.082238 | 0.129638 | 0.189145 |
| $E_2$ | −1.0089E−06 | 0.034613 | 0.082238 | 0.129638 | 0.189145 |
| $E_3$ | −1.3086E−07 | −9.5E−07 | 0.082238 | 0.129638 | 0.189145 |
| $E_4$ | <u>−1.08E−07</u> | −5.5E−07 | −1.8E−06 | 0.129639 | 0.189146 |
| $E_5$ | <u>−8.14E−08</u> | −4.1E−07 | −1.9E−06 | −3.3E−06 | 0.189147 |
| $E_6$ | <u>−5.05E−08</u> | <u>−2.57E−07</u> | −1.2E−06 | −3E−06 | −6.9E−06 |

The approximated (e.g., estimated) measurements are shown as underlined in Table 7. The simulated results indicate that errors associated with the estimation technique are larger in the example of Table 7 (up to 2%, for example), as compared to the example of Table 4. However, the technique of FIG. 6 as illustratively simulated in Table 7 may still be used in environments where the voltage measurements are excessively noisy.

Generally, the techniques shown illustratively in FIGS. 5 and 6 include forming estimates based on measurements or

TABLE 6

|  | $VM_1/VM_1, M_2$ | $VM_3/VM_3, M_4$ | $VM_5/VM_5, M_6$ | $VM_7/VM_7, M_8$ | $VM_9/VM_9, M_{10}$ |
|---|---|---|---|---|---|
| $E_1$ | 54.6435511 | 32.273497 | 12.4128202 | 6.74566464 | 3.578472623 |
| $E_2$ | −1137468.5 | 32.2695037 | 12.4133749 | 6.74601731 | 3.578714621 |
| $E_3$ | <u>−8028596.4</u> | −1111131.4 | 12.4149512 | 6.74705704 | 3.579428133 |
| $E_4$ | <u>−8411165.1</u> | <u>−1642259.7</u> | −499908.14 | 6.74998974 | 3.581420794 |
| $E_5$ | <u>−8780380.9</u> | <u>−1716973.1</u> | <u>−380696.91</u> | −218032.33 | 3.585915483 |
| $E_6$ | <u>−9128658.6</u> | <u>−1786228.3</u> | <u>−396869.87</u> | −151683.42 | −67020.8615 |

By inspection of Table 6, particularly in the underlined portions, it is shown that the ratio of $VM_1/VM_1, M_2$ (e.g., the ratio of the absolute voltage of monitor electrode $M_1$ to a differential voltage across monitor electrodes $M_1, M_2$) is similar for excitation modes $E_3$ through $E_6$. Similarly, $VM_3/VM_3, M_4$ is similar for excitation modes $E_4$ through $E_6$, and $VM_5/VM_5, M_6$ is similar for excitation modes $E_5$ through $E_6$.

In view of the ratios (e.g., scaling factors) shown in Table 6, the approximations obtained using the techniques of FIG. 5 may be further extended to include absolute voltage terms, such as shown in the following relations:

$$\overline{VM_1, M_2(E_4)} \approx \frac{VM_1, M_2(E_3) \times VM1(E_4) \times VM_5, M_6(E_6) \times VM_5(E_5)}{VM_1(E_3) \times VM_5(E_6) \times VM_5, M_6(E_5)}$$

$$VM_1, M_2(E_5) \approx \frac{\overline{VM_1, M_2(E_4)} \times VM_3, M_4(E_5)}{VM_3, M_4(E_4)}$$

$$VM_3, M_4(E_6) \approx \frac{VM_3, M_4(E_5) \times VM_5, M_6(E_6)}{VM_5, M_6(E_5)}$$

$$VM_1, M_2(E_6) \approx \frac{\overline{VM_1, M_2(E_4)} \times VM_3, M4(E_5) \times VM_5, M_6(E_6)}{VM_3, M_4(E_4) \times VM_5, M_6(E_5)}$$

The absolute voltage received from a particular monitor electrode is referred to as $VM_N$, where N refers to the monitor electrode position. In the illustrative example above, the absolute voltage and voltage differences received from monitor electrode $M_1$ and pair $M_1, M_2$ in mode $E_3$ are used to approximate $VM_1, M_2$ in other modes, such as $E_4, E_5$, or $E_6$. Estimates derived using one ratio can be re-used for other estimates, such as the estimate $\overline{VM_1, M_2(E_4)}$, indicated ratios of measurements received from two different excitation modes, for example. However, the present inventors have also recognized that such techniques can be further extended, such as including using measurements or ratios of measurements from more than two excitation modes.

An Estimation Technique Using Relationships Derived from a Different Resistivity or Resistivity Range The techniques discussed in relation to the examples of FIGS. 5 through 6, and elsewhere herein, may be used to estimate a conductive measurement corresponding to a first pair of measurement electrodes, such as using values received from other electrodes or electrode pairs or values received from the first electrode pair in a different excitation mode. However, the techniques of FIGS. 5 through 6 generally assume that other parameters of measurement, such as the formation resistivity, are roughly similar for each measurement electrode pair and for each excitation mode. The present inventors have also recognized that relationships between measurements (or models) generated for different formation resistivities may be used to estimate a voltage difference measurement obtainable from a respective pair of monitor electrodes.

FIG. 7 illustrates generally an example of a technique 700, such as a method, including estimating a voltage difference corresponding to a first pair of monitor electrodes in a first excitation mode using information about respective voltage differences received from a second pair of monitor electrodes respectively corresponding to a first resistivity and a different second resistivity.

For example, at 702, a scaling factor may be determined using information about respective voltage differences received from a second pair of monitor electrodes corresponding to a first resistivity and a different second resistivity.

At 704, the scaling factor may be applied to a voltage difference received from the first pair of monitor electrodes corresponding to the different second resistivity, such as to obtain an estimated voltage difference between the first pair of electrodes corresponding to the first resistivity as could be received in the first excitation mode. For example, the voltage difference received from the first pair of monitor electrodes corresponding to the second resistivity could be either received experimentally or modeled as a function of various parameters, such as a tool radius, borehole standoff from an electrode surface, an assumed mud resistivity, an assumed formation resistivity, or one or more ranges corresponding to such parameters.

In an illustrative example, such as shown below in Table 8, voltage differences for the finite element modeled simulation geometry discussed in relation to Table 1 may be obtained, such as assuming a formation resistivity, $R_f$, changed to 40,000 Ω-m, as compared to 100,000 Ω-m for the previous illustrative examples.

TABLE 8

|  | $VM_1, M_2$ | $VM_3, M_4$ | $VM_5, M_6$ | $VM_7, M_8$ | $VM_9, M_{10}$ |
|---|---|---|---|---|---|
| $E_1$ | 0.022194 | 0.034606 | 0.082233 | 0.129626534 | 0.189122572 |
| $E_2$ | −1.2E−06 | 0.034612 | 0.082233 | 0.129626749 | 0.18912285 |
| $E_3$ | −3.3E−07 | −2E−06 | 0.082234 | 0.129627389 | 0.189123672 |
| $E_4$ | −2.7E−07 | −1.4E−06 | −5.6E−06 | 0.12962856 | 0.189125987 |
| $E_5$ | −2E−07 | −1E−06 | −4.7E−06 | −1.06179E−05 | 0.189129598 |
| $E_6$ | −1.3E−07 | −6.4E−07 | −2.9E−06 | −7.55524E−06 | −1.72689E−05 |

The results obtained in Table 8 differ from Table 1. A ratio of the results of Table 8 with respect to corresponding elements in Table 1 may be determined, such as shown in the illustrative example of Table 9, below.

TABLE 9

|  | $VM_1, M_2$ | $VM_3, M_4$ | $VM_5, M_6$ | $VM_7, M_8$ | $VM_9, M_{10}$ |
|---|---|---|---|---|---|
| $E_1$ | 0.999987802 | 0.999965 | 0.999939 | 0.999911 | 0.999882 |
| $E_2$ | 1.223406427 | 0.999966 | 0.99994 | 0.999912 | 0.999883 |
| $E_3$ | 2.49374914 | 2.06385 | 0.999944 | 0.999915 | 0.999886 |
| $E_4$ | 2.492806422 | 2.492824 | 3.06139 | 0.999923 | 0.999893 |
| $E_5$ | 2.491542767 | 2.491564 | 2.491605 | 3.250483 | 0.99991 |
| $E_6$ | 2.489993058 | 2.489979 | 2.490015 | 2.490098 | 2.514779 |

For high relatively high formation resistivities (e.g., 10's of kilo Ω-m or more), and for certain electrode combinations, elements of Table 9 again show similar ratio values and correspond to electrode combinations and excitation modes that generally exhibit a high sensitivity to system or environmental error (e.g., combinations underlined in the example of Table 9), thus providing another opportunity for use of estimation or approximation techniques.

Amongst the electrode and excitation mode combinations shown in the illustrative example of Table 9, the differential voltage $VM_9$, $M_{10}$ in excitation mode $E_6$ would generally have the highest amplitude and thus may be used to generate the results for the other combinations having a similar ratio as shown in the underlined portions of Table 9. Generally, the ratio $VM_9, M_{10}$ corresponding to excitation mode $E_6$ could be used to estimate or approximate electrode and excitation combinations in other portions of Table 8, such as using a relation:

$$VM_{2i-1}, M_{2i}(E_k, R_f = 40{,}000 \; \Omega\text{-m}) \approx$$
$$\frac{VM_9, M_{10}(E_6, R_f = 40{,}000 \; \Omega\text{-m}) \times VM_{2i-1}, M_{2i}(E_k, R_f = 100{,}000 \; \Omega\text{-m})}{VM_9, M_{10}(E_6, R_f = 100{,}000 \; \Omega\text{-m})},$$
$$i = 1, \ldots, 5; k = i+2, \ldots, 6$$

In the relation above, $VM_{2i-1}$ $M_{2i}$ represents a voltage difference between the (2i−1)-th and the 2i-th monitor electrodes, corresponding to excitation mode $E_k$, where k is the excitation mode, and with formation resistivity $R_f$ as shown. For example, In the illustrative example of Table 10, the underlined voltage differences are approximated using the relation illustrated generally above, such as corresponding to a formation resistivity of 40,000 Ω-m as may be approximated by a measurement or using a modeled value from a formation having a different resistivity of 100,000 Ω-m. The values provided herein (e.g., 40,000 Ω-m and 100,000 Ω-m) are illustrative in nature, and other resistivity values may be used.

TABLE 10

|  | $VM_1, M_2$ | $VM_3, M_4$ | $VM_5, M_6$ | $VM_7, M_8$ | $VM_9, M_{10}$ |
|---|---|---|---|---|---|
| $E_1$ | 0.022194017 | 0.034606 | 0.082232547 | 0.129626534 | 0.189122572 |
| $E_2$ | −1.23433E−06 | 0.034612 | 0.082232707 | 0.129626749 | 0.18912285 |
| $E_3$ | −3.29E−07 | −1.95E−06 | 0.082233615 | 0.129627389 | 0.189123672 |
| $E_4$ | −2.71E−07 | −1.39E−06 | −5.55652E−06 | 0.12962856 | 0.189125987 |
| $E_5$ | −2.04E−07 | −1.04E−06 | −4.70E−06 | −1.06179E−05 | 0.189129598 |
| $E_6$ | −1.27E−07 | −6.48E−07 | −2.92E−06 | −7.63E−06 | −1.72689E−05 |

In some examples, the expression $VM_{2i-1}, M_{2i}$ may also be approximated using other measurements including using measurements or simulated values determined as a function of borehole diameter, tool diameter, or borehole standoff from a surface of the electrode located along the tool body. Also, in some examples, other combinations of electrode pairs may be used, including measurements received from a higher formation resistivity (e.g., about 100,000 Ω-m) to estimate or otherwise derive approximations of measurements corresponding to a lower formation resistivity (e.g., about 40,000 Ω-m in the illustrative examples herein). For example, a relation show below may be used, such as using measurements from a different electrode combination than the previous example:

$$VM_{2i-1}, M_{2i}(E_k, R_f = 40{,}000 \; \Omega\text{-m}) \approx$$
$$\frac{VM_5, M_6(E_6, R_f = 40{,}000 \; \Omega\text{-m}) \times VM_{2i-1}, M_{2i}(E_k, R_f = 100{,}000 \; \Omega\text{-m})}{VM_5, M_6(E_6, R_f = 100{,}000 \; \Omega\text{-m})},$$
$$i = 1, \ldots, 2; k = i+2, \ldots, 6$$

Tables of modeled values, such as discussed above, may be pre-calculated and stored or determined on-the-fly, and may be retrieved such as in response to one or more of a user input or a detected resistivity range of a formation, or in response to one or more other input parameters or detected parameters such as a tool radius, borehole radius, or standoff between a borehole wall and a surface of an electrode.

The techniques described in FIGS. 5 through 7 were further modeled or verified, such as using a Monte Carlo simulation. For example, the following relationships were established, using notation similar to the examples of FIGS. 5-7:

$$\tilde{V}M_i(E_k) = \tilde{V}_i(E_k) + u[-10^{-6}, 10^{-6}]; \ i=1:10$$

$$\tilde{V}M_{2i-1}, M_{2i}(E_k) = \tilde{V}M_{2i-1}, M_{2i}(E_k) + u[-10^{-6}, 10^{-6}]; \ i=1:5$$

In the example above, $u[-10^{-6}, 10^{-6}]$ represents a random error with uniform distribution for each trial, between the values of ±1 micro Volts. Simulations of mud resistivities of {0.02, 0.2, 1} Ω-m and formation resistivities of {0.2, 1, 2, 10, 20, 100, 200, 1000, 2000, 10000, 20000, 100000} Ω-m generally indicate that the techniques of FIGS. 5 through 7 provide a significant improvement in error tolerance, particularly for formation resistivities of about 1000 Ω-m or greater when probed from a mud having a resistivity of about 0.02 Ω-m.

Such Monte Carlo techniques may be used, such as to establish a resistivity or voltage threshold that may be used to toggle a laterolog apparatus between using conductively-received voltage measurements in all excitation modes, versus using estimates of certain voltage measurements for certain electrode combinations when a high formation resistivity is detected, suspected, or indicated by a user, or when a particularly low mud resistivity is detected, suspected, or indicated by a user.

FIG. 8 illustrates generally an example of a technique, such as a method, including comparing information indicative of a measured signal (e.g., a conductively received signal from a monitor electrode) to a specified threshold, and in response, determining a resistivity using an estimated induced signal or inhibiting determining the resistivity using the estimated induced signal.

For example, at 802, information indicative of a measured signal from a monitor electrode may be compared to a threshold. The signal need not be received from a monitor electrode for which an estimate or substitution will be made, because other monitor electrodes may still provide useful information indicative of whether a formation resistivity is sufficiently high to warrant using an approximation or estimate rather than a full rank of measured electrode combinations.

In an illustrative example, a threshold may be applied to a differential measurement received from $VM_1, M_2(E_1)$, and if the voltage difference is less than the threshold, estimates such as discussed in the examples of FIGS. 5 through 7 may be used. Such a threshold may be established at least in part using information about a resistance or resistivity criterion, indicative of a relative or absolute formation resistivity, such as compared to a mud resistivity. For example, at 804, if the information indicative of the measured signal is below the threshold (e.g., a sensed voltage is below a specified threshold), one or more estimation techniques may be used in support of determining a resistivity estimate, such as in lieu of obtaining actual measurements for those combinations that may be unreliable or subject to excessive noise. At 806, if the information indicative of the measured signal from a specified electrode combination in a specified excitation mode is not below the threshold, then estimation activities may be suppressed, inhibited, or scaled back because reliable voltage measurements may be performed in some or all excitation modes.

FIG. 9 illustrates generally an example of a drilling apparatus 900, such as including a measure-while-drilling (MWD) or log-while-drilling (LWD) capability. The illustrative example of FIG. 9 may include apparatus such as shown in FIGS. 1 through 2, or may be used with techniques discussed in relation to FIGS. 3, 4A through E, or 5 through 8. A drilling rig or platform 902 generally includes a derrick 904 or other supporting structure, such as including or coupled to a hoist 906. The hoist 906 may be used for raising or lowering equipment or other apparatus such as drill string 908. The drill string 908 may access a borehole 916, such as through a well head 912. The lower end of the drill string 908 may include various apparatus, such as a drill head 914, such as to provide the borehole 916.

A drilling fluid or "mud" may be circulated in the annular region around the drill head 914 or elsewhere, such as provided to the borehole 916 through a supply pipe 922, circulated by a pump 920, and returning to the surface to be captured in a retention pit 624 or sump. Various subs or tool assemblies may be located along the drill string 908, such as include a bottom hole assembly (BHA) 926 or a second sub 928.

As the BHA 926 or second sub 928 pass through various regions of a formation 918, information may be obtained. For example, the BHA 926, or the second sub 928, may include apparatus such as shown in the examples of FIG. 1 or 2, such as to obtain array laterolog measurements for use in determining an apparent formation 918 resistivity. The second sub 928 may include wireless telemetry or logging capabilities, or both, such as to transmit or later provide information indicative of a formation resistivity to operators on the surface or for later access in evaluation of formation 918 properties. For example, portions 930 of the apparatus 900 at the surface may include one or more of wireless telemetry, processor circuitry, or memory facilities, such as to support log-while-drilling (LWD) or measurement-while-drilling (MWD) operations.

FIG. 10 illustrates generally an example of a wireline logging apparatus. The illustrative example of FIG. 10 may include apparatus such as shown in FIGS. 1 through 2, or may be used with techniques discussed in relation to FIGS. 3, 4A through 4E, or 5 through 8. Similar to the example of FIG. 9, a hoist 906 may be included as a portion of a platform 902, such as coupled to a derrick 904, and used to raise or lower equipment such as a wireline sonde 1050 into or out of a borehole. In this wireline example, a cable 1042 may provide a communicative coupling between a logging facility 1044 (e.g., including a processor circuit 1045 or other storage or control circuitry) and the sonde 1050. In this manner, information about the formation 918 may be obtained, such as using an array laterolog tool included as at least a portion of the sonde 1050 as discussed in other examples herein (e.g., a laterolog tool including apparatus 100 as in FIG. 1 or apparatus 200 as in FIG. 2).

For purposes of illustration, the examples of FIGS. 9 and 10 show a vertically-oriented borehole configuration. However, the apparatus and techniques described herein may also be used in other borehole configurations, such as a borehole including a horizontal penetration direction, or an oblique borehole configuration, for example. The examples of FIGS. 9 and 10 also generally illustrate land-based examples. But, apparatus and techniques described herein may be used in offshore environments as well, such as for subsea operations. In particular, offshore or subsea operations may include use of wireline or LWD/MWD apparatus and techniques including aspects of the examples herein.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The claimed invention is:

1. A method for obtaining information indicative of a formation resistivity, comprising:
   lowering a well tool in a borehole, the well tool comprising an array of electrodes located on the well tool, the array of electrodes including at least one excitation electrode and a number of monitor electrodes that include a number of pairs of monitor electrodes;
   coupling an electrical excitation from the well tool in the borehole to a geologic formation through which the borehole extends, the electrical excitation coupled through the at least one excitation electrode on the well tool selected according to one of a number of excitation modes that defines at least one of a current waveform and a frequency of the electrical excitation;
   receiving from the geologic formation induced voltages resulting from the electrical excitation using the number of monitor electrodes selected according to one of the number of excitation modes;
   estimating a voltage difference between a first pair of monitor electrodes in a first excitation mode of the number of excitation modes at least in part through use of at least one of an induced voltage received through a different monitor electrode from the first pair of monitor electrodes and a voltage difference associated with the first pair of monitor electrodes which is received in a second excitation mode of the number of excitation modes; and
   determining the formation resistivity using the estimated voltage difference.

2. The method of claim 1, comprising:
   comparing information indicative of a received induced voltage resulting from the electrical excitation to a threshold; and
   in response, when the information indicative of the induced voltage is below the threshold, determining the formation resistivity using the estimated voltage difference.

3. The method of claim 2, wherein the threshold comprises a voltage threshold.

4. The method of claim 2, wherein the threshold corresponds to at least one of a resistance threshold and a resistivity threshold.

5. The method of claim 1, wherein estimating the voltage difference between the first pair of monitor electrodes in the first excitation mode includes:
   determining a scaling factor using information about a voltage difference received from a second pair of monitor electrodes respectively in the first excitation mode and in the second excitation mode; and
   applying the scaling factor to a voltage difference received from the first pair of monitor electrodes in the second excitation mode to obtain an estimated voltage difference between the first pair of electrodes for the first excitation mode.

6. The method of claim 5, wherein the determining the scaling factor includes determining a ratio of the voltage difference received from the second pair of monitor electrodes in the first excitation mode to the voltage difference received from the second pair of monitor electrodes in the second excitation mode.

7. The method of claim 1, comprising determining a resistivity using information about the electrical excitation, the received induced voltage, and the estimated voltage difference.

8. The method of claim 1, wherein the array of electrodes is arranged longitudinally along a tool body located in the borehole.

9. The method of claim 8, comprising using conductively received respective induced voltages and an estimated voltage difference to estimate a formation resistivity in a focusing mode corresponding to a respective degree of penetration into the formation extending outward radially from the array of electrodes in the borehole.

10. The method of claim 9,
    wherein generating the electrical excitation comprises generating respective currents conductively coupleable from the borehole to the geologic formation using a respective combination of excitation electrodes located in the borehole, the currents generated according to the excitation mode; and
    wherein obtaining information indicative of the formation resistivity using a respective combination of monitor electrodes located in the borehole includes establishing an equal potential between at least two monitor electrodes included in the respective combination of monitor electrodes, the at least two monitor electrodes selected according to the focusing mode.

11. The method of claim 10, wherein the respective currents include respective different frequencies of excitation.

12. The method of claim 1, comprising:

comparing information indicative of a received induced voltage resulting from the electrical excitation to a threshold, wherein the threshold is based on a resistivity criterion;

in response, when the information indicative of the received induced voltage is below the threshold, determining the resistivity using the estimated voltage difference; and in response, when the information indicative of the received induced voltage is above the threshold, determining the resistivity using a measured voltage difference between the first pair of monitor electrodes in the first excitation mode.

13. An apparatus, comprising:

a well tool body;

an array of electrodes located on the well tool body, the array of electrodes including: respective excitation electrodes and respective monitor electrodes, coupled from a borehole to a geologic formation through which the borehole extends when the well tool body is located within the borehole; and a processor circuit coupled to the respective excitation electrodes using an excitation circuit, and coupled to the respective monitor electrodes using a measurement circuit, the processor circuit programmed to:

control the excitation circuit to generate an electrical excitation from the well tool body coupled to the geologic formation through excitation electrodes on the well tool selected according to an excitation mode;

control the measurement circuit to receive from the geologic formation induced voltages resulting from the electrical excitation using monitor electrodes selected according to the excitation mode;

estimate a voltage difference between a first pair of monitor electrodes in the excitation mode through use of an induced voltage received through at least one additional monitor electrode and a voltage difference associated with the first pair of monitor electrodes which is received in another excitation mode; and determine the formation resistivity using the estimated voltage difference.

\* \* \* \* \*